United States Patent [19]

Blazek et al.

[11] Patent Number: 5,600,534
[45] Date of Patent: Feb. 4, 1997

[54] CAPACITOR HAVING NON-CONDUCTIVE PLASTIC FRAMES

[75] Inventors: Wayne W. Blazek; James J. Bolstad, both of Milwaukee; Phillip A. Eidler, Muskego; Carl D. Jahns, Franklin; Ronald C. Miles, Milwaukee, all of Wis.; Robin A. Vidas, Fenton, Mich.; Peter J. Lex, Wauwatosa, Wis.

[73] Assignee: ZBB Technologies, Inc., Wauwatosa, Wis.

[21] Appl. No.: 542,287

[22] Filed: Oct. 12, 1995

[51] Int. Cl.⁶ ........................................................ H01G 9/00
[52] U.S. Cl. ............................................. 361/502; 361/526
[58] Field of Search ..................................... 361/502, 523, 361/525–526, 541; 29/25.03

[56] References Cited

U.S. PATENT DOCUMENTS

| | | |
|---|---|---|
| 3,426,257 | 2/1969 | Youngquist . |
| 4,125,680 | 11/1978 | Shropshire et al. ........................ 429/4 |
| 4,562,511 | 12/1985 | Nishino et al. . |
| 4,563,723 | 1/1986 | Meyers ...................................... 361/305 |
| 4,737,889 | 4/1988 | Nishino et al. . |
| 5,072,335 | 12/1991 | Kurabayashi et al. .................. 361/502 |
| 5,072,336 | 12/1991 | Kurabayashi et al. .................. 361/502 |
| 5,072,337 | 12/1991 | Kurabayashi et al. .................. 361/502 |
| 5,077,634 | 12/1991 | Shirata et al. ........................... 361/502 |
| 5,115,378 | 5/1992 | Tsuchiya et al. ....................... 361/502 |
| 5,121,301 | 6/1992 | Kurabayashi et al. .................. 361/502 |
| 5,420,747 | 5/1995 | Ivanov et al. ........................... 361/502 |
| 5,450,279 | 9/1995 | Yoshida et al. ......................... 361/502 |

Primary Examiner—Bot L. Ledynh
Attorney, Agent, or Firm—Godfrey & Kahn, S.C.

[57] ABSTRACT

An improved capacitor including a plurality of plastic frame mounted electrode and separator inserts. The plastic frame mounted electrode and separator inserts are oriented in alternating succession, and have a carbon paste placed therebetween. The capacitor includes terminal electrodes through which electric charge may flow. The capacitor also includes a pair of rigid endblocks.

25 Claims, 6 Drawing Sheets

CAPACITOR HAVING NON-CONDUCTIVE PLASTIC FRAMES

BACKGROUND OF THE INVENTION

1. Field of the Invention

The present invention relates to capacitors, and more particularly, the present invention relates to high farad, double-layer capacitors that include improved electrodes which are enclosed within a sealed plastic case.

2. Description of the Prior Art

Conventional double-layer capacitors include two polarizable bodies which are made of a paste of activated carbon and sulfuric acid. The individual carbon paste bodies are held apart, but disposed in close proximity by a porous separator. Electrical contact with each of the carbon paste bodies is established by means of conductive electrodes. Double-layer capacitors store energy by forming a polarized liquid layer at the surface of the conductive electrodes.

A typical double-layer capacitor contains a single cell. Such a capacitor includes a pair of current collectors or current electrodes; a pair of polarized electrodes separated by a non-woven fabric or porous separator; and a gasket positioned between the current electrodes and surrounding the polarized electrodes and the separator. The polarized electrodes of such a capacitor are manufactured from activated carbon and are impregnated with an electrolyte such as, for example, an acid.

One of the shortcomings inherent with a polarized capacitor of the construction discussed above is its internal electrical resistance. In most prior-art capacitors, the individual particles of carbon in the polarized electrode are not joined together. This physical environment causes the internal resistance of the electrode to be high. In order to reduce the internal resistance of the polarized electrode it is necessary to bring all the particles of carbon into improved electrical contact with each other.

A further shortcoming with the prior-art construction of polarized capacitors is that the internal resistance of conventional double-layer capacitors is also greatly affected by the contact resistance between the collector electrodes and the polarized electrodes. To reduce the contact resistance between the polarized electrodes and the collector electrodes, and to further reduce the internal resistance of the polarized electrodes, the capacitor cells of the prior art are kept under pressure. Such pressure normally brings the particles of activated carbon into improved electrical contact with each other. Additionally, the pressure also brings the polarized and collector electrodes into improved electrical contact with each other. In this regard, conventional double-layer capacitors are normally kept under a pressure of about 100 kg/cm$^2$. Prior-art, double-layer capacitors are kept under pressure by deforming their outer cases, which are usually made from metal. Another method used to apply the appropriate pressure involves bonding the collector electrodes strongly to the gaskets.

The capacitance of a double-layer capacitor may be improved by increasing the cross-sectional area of the basic cell. However, when the cross-sectional area of the cell is increased, the pressure applied to the double-layer capacitor must correspondingly increase. Increasing the pressure causes practical problems such as finding a means for applying the pressure, and increasing the strength of the outer case which encloses the basic cell.

In addition to the problems noted above, double-layer capacitors suffer from additional problems. One such problem is leaking. Double-layer capacitors typically use an acid as an electrolyte, and because the casing which encloses the capacitor is typically metal, the capacitors corrode and subsequently leak. In addition to the identified leaking, the gaskets employed in conventional double-layer capacitors are subject to degradation, which manifests itself by cracking and wrinkling, and which is a result of corrosion, as well as heat induced expansion and retraction. Accordingly, conventional capacitors may experience leaking in the area around and through their respective gaskets.

The prior art is replete with numerous examples of assorted devices and assemblies which have attempted to improve conventional double-layer capacitor design. Many of these prior-art attempts have been directed to increasing the capacitance of a double-layer capacitor without increasing the external pressure applied to the basic cell. For example, U.S. Pat. No. 5,086,373 ("the '373 patent"), which issued to Kurabayashi, discloses a double-layer capacitor which has a construction where the carbon particles in the polarized electrode are joined together by sintering the electrode. In such a sintered electrode arrangement, the individual particles of carbon are joined together, but the polarized electrode remains relatively porous. Accordingly, the internal resistance of the electrode is reduced, while the surface area of the respective electrodes remains relatively high. To further improve the electrical contact between the polarized electrodes and the collector electrodes, the device described in the '373 patent employs individual collector electrodes which are manufactured by a technique which includes hot curing a mixture of rubber and conductive particles and applying it to the polarized electrodes. The hot curing process results in the rubber flowing into the porous polarized electrode and, thereby, increasing the area of contact between the polarized electrodes and the collector electrodes.

While the process disclosed in the '373 patent results in an improved capacitor which eliminates some of the shortcomings attributed to conventional designs, it is still unsatisfactory for applications where a capacitor having a very large capacitance is desirable. Such applications include so-called "SLI" or starting, lighting, and ignition applications. Typically, in such applications a relatively large capacitance capacitor is electrically coupled to a battery, or other voltage source, which is used to start a machine such as an industrial engine or motor. In these circumstances, the starting of the engine requires a significant amount of current early in the starting process, and then less current as the starting proceeds. Capacitors are used to provide the initial current in such an application, thereby reducing the current demands on the battery coupled to it. The battery provides the rest of the current necessary to start the engine.

In addition to their unsatisfactory operation in SLI applications, conventional double-layer capacitors, are generally expensive, heavy, and difficult to dispose of or recycle once they have reached the end of their commercial usefulness.

As noted, the capacitance of a capacitor may be increased by increasing the area of the basic cell. As described, most double-layer capacitors utilize a paste consisting of carbon powder and an electrolyte. Another factor upon which the capacitance of double-layer capacitors depends is the active surface area of the carbon powder used in the paste. If an improved powder could be developed for use in such pastes, the performance of capacitors could also be improved.

Accordingly, it would be desirable to have a double-layer capacitor having even greater capacitance than prior-art devices. It would also be desirable to have a capacitor which is relatively lightweight and relatively inexpensive. It would also be desirable to have a capacitor which has an advantageous combination of capacitance, weight, and cost characteristics, unachieved heretofore, and to have a capacitor which is substantially leak-free and which can be enclosed within a corrosion-resistant container. Finally, it would be desirable to have a capacitor which is manufactured from materials which can be readily recycled.

OBJECTS AND SUMMARY OF THE INVENTION

Therefore, it is an object of the present invention to provide an improved capacitor having a high farad capacity.

A further object of the present invention is to provide a double-layer capacitor having a low internal electrical resistance.

A further object of the present invention is to provide a double-layer capacitor which avoids many of the problems associated with the prior-art practice of applying external pressure to the components thereof.

A further object of the present invention is to provide a double-layer capacitor which is lightweight in relative comparison to prior-art devices.

A further object of the present invention is to provide a double-layer capacitor having a substantially leak-free and corrosion-resistant container or casing.

A further object of the present invention is to provide a double-layer capacitor which is relatively easy to dispose of once it has reached the end of its commercial usefulness.

A further object of the present invention is to provide a double-layer capacitor that is manufactured from recyclable materials.

A further object of the present invention is to provide a double-layer capacitor having a novel, gasket-free construction.

These and other objects and advantages are achieved in an improved capacitor of the present invention and which includes a plurality of non-conductive plastic frames. The frames are constructed in a manner which permits the positioning or mounting of various components in various orientations therein. In this regard, a plurality of carbon-filled conductive electrode inserts are mounted on a predetermined number of the non-conductive plastic frames. Further, each carbon-filled conductive electrode insert has a first surface and an opposite second surface. Two conductive electrode inserts are normally mounted in an adjacent position one to the other within one plastic frame, thereby forming an electrode.

The improved capacitor of the present invention also includes first and second terminal electrodes. Each terminal electrode includes at least one plastic frame mounted, carbon-filled conductive electrode insert which has a metal screen imbedded therein, and a metal stud terminal which is electrically coupled to the metal screen.

The improved capacitor of the present invention also includes a plurality of microporous separator inserts which are mounted in a predetermined number of the plastic frames. In this regard, each of the plastic frame mounted separator inserts is oriented or otherwise positioned in sandwiched relation between two adjacent carbon-filled conductive electrode inserts. The gaps between each of the carbon-filled conductive electrode inserts and each of the microporous separators are filled with a carbon paste. The plurality of plastic frames, in which the conductive electrode and the microporous separator inserts are mounted, are joined to one another by thermal welding, or a similar technique, to form a substantially fluid impervious outer enclosure or case.

The improved capacitor of the present invention includes first and second endblocks which are of rigid design. In this respect, the endblocks maintain pressure on the plurality of plastic frames thereby preventing deformation of the plastic frames and further maintain good internal electrical contact between the internal components of the capacitor, thereby facilitating a lower internal resistance. In an alternative embodiment of the present invention, conductive electrode inserts, each having a metal screen imbedded therein and a metal stud terminal which is electrically coupled to the metal screen, are mounted in the first and second rigid endblocks. Such endblocks function as terminal electrodes and, therefore, in a capacitor having such endblocks the necessity of having separate terminal electrodes is eliminated.

The improved capacitor of the present invention may also include a carbon coating in the form of a carbon powder or carbon cloth applied to the surfaces of the individual carbon-filled conductive electrodes.

These and other objects and advantages of the present invention will become more apparent from the following detailed description of the preferred embodiment of the present invention taken in combination with the accompanying drawings.

DETAILED DESCRIPTION

First Embodiment

Figure 1:
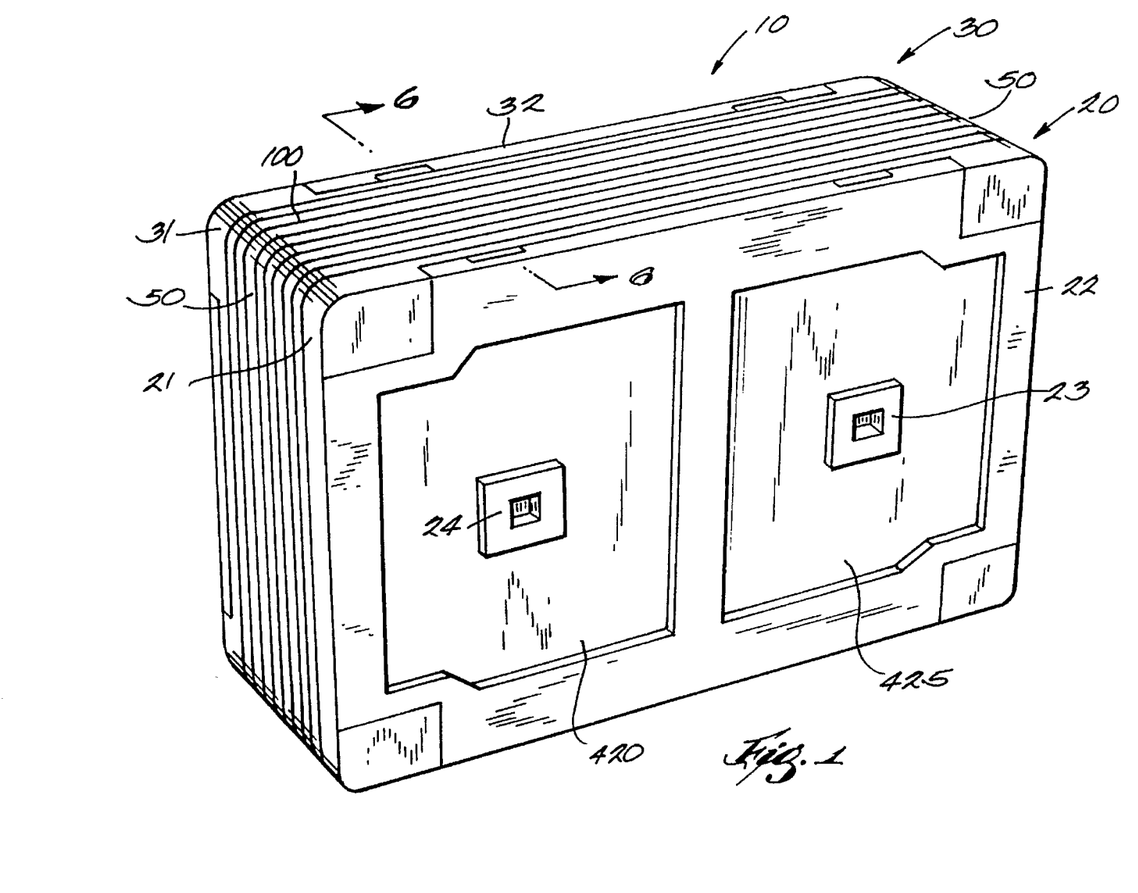
FIG. 1 is a perspective, environmental, side elevation view of the capacitor of the present invention.

Referring more particularly to the drawings, the capacitor of the present invention is designated generally by the numeral 10 in FIG. 1. The capacitor 10 includes a first endblock 20 and a second or opposite endblock 30. The first endblock 20 includes an end plate 21 and a cover 22. Similarly, the second endblock 30 includes an end plate 31 and a cover 32. The specifics of the construction of the endblocks 20 and 30 are explained in further detail in U.S. Pat. No. 5,308,718, which is incorporated by reference herein.

The endblocks 20 and 30 each include a pair of openings. The openings in endblock 30 are not seen in the drawings. The openings 23 and 24 of the endblock 20 each receive therethrough individual metal stud terminals. These stud terminals will be discussed in greater detail hereinafter.

Oriented in sandwiched relation between the respective endblocks 20 and 30 is a plurality of individual components 50. The components 50 of the capacitor 10 include individual nonconductive frames 100 which are constructed so as to permit the mounting of various additional subcomponents therein. The nonconductive frames are typically manufactured from a synthetic, polymeric based material.

Figure 2:
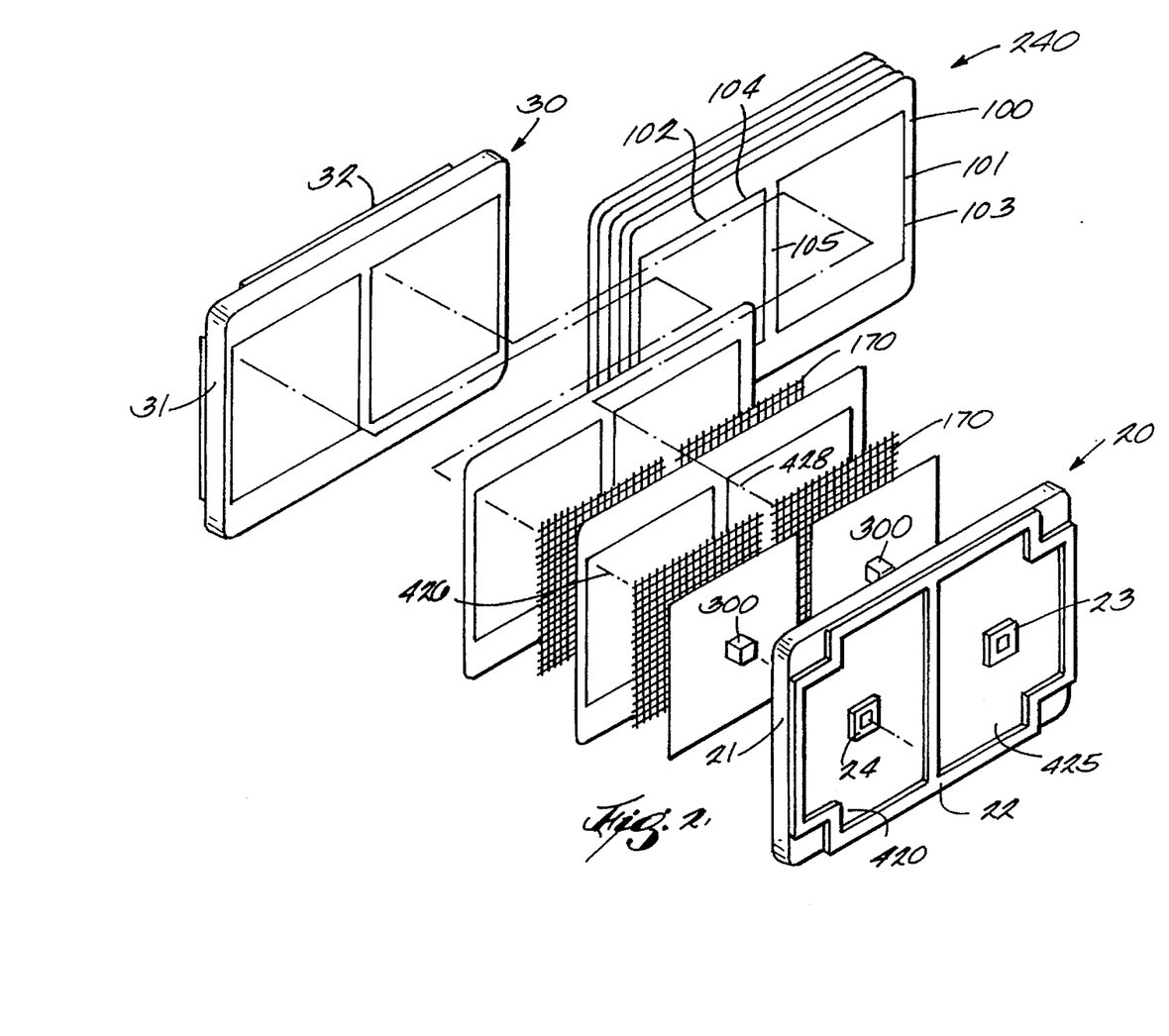
FIG. 2 is a slightly reduced, perspective, exploded view of the capacitor of the present invention.

As more clearly seen in the exploded view of FIG. 2, each of the frames 100 includes a first opening 101 and an adjacent, second opening 102 of substantially the same size and dimensions. The first opening 101 is defined by a peripheral edge 103, and the second opening 102 is defined by a peripheral edge 104. Each frame 100 includes a center rib 105 which includes weld beads (not shown). The frames 100 are designed to achieve a capacitor 10 which has two side-by-side capacitors cells which are discussed in greater detail hereinafter. The frames 100 are manufactured by an injection molding technique which utilizes a glass-filled, high density polyethylene. The individual frames 100, as are the rest of the synthetic components described herein, are constructed in accordance with conventional plastic manufacturing processing techniques. In view of the fact that the capacitor 10 of the present invention is manufactured of plastic, it is relatively lightweight as compared to the prior-art devices which have traditionally been manufactured from metal. In addition, and because many of the components of the capacitor 10 may be manufactured from a source of high density polyethylene, the several capacitor components are readily recyclable into products such as plastic lumber, plastic planters, traffic bumps, and other useful objects.

Figure 3:
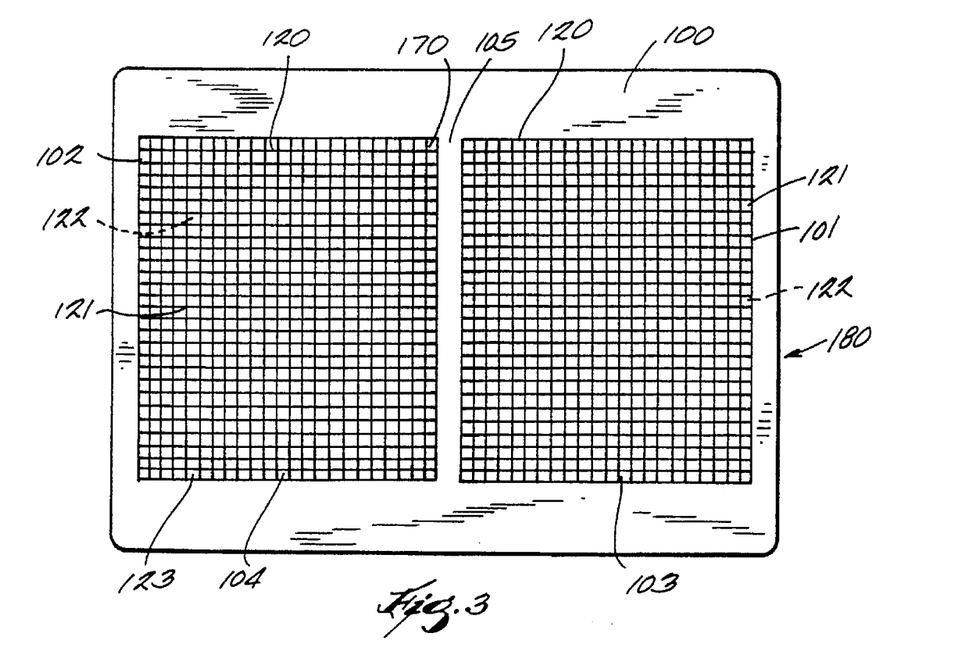
FIG. 3 is a side elevation view of a carbon-filled conductive electrode employed in the capacitor of the present invention.
Figure 7:
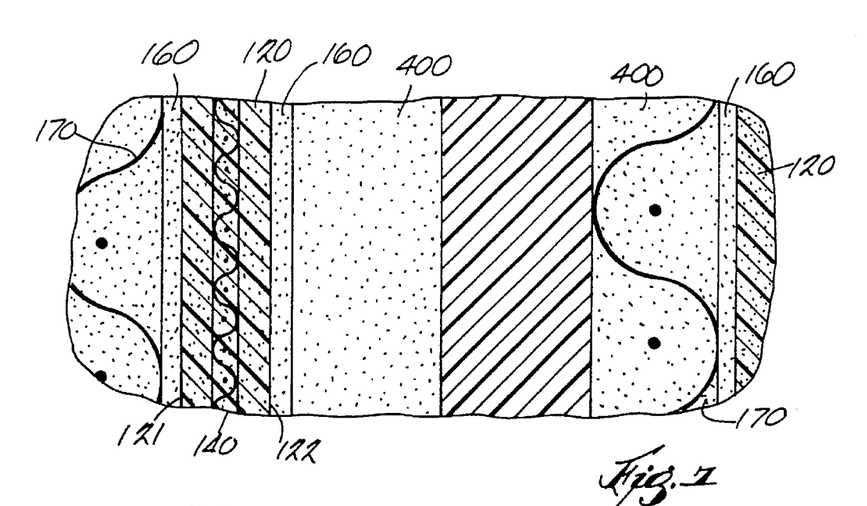
FIG. 7 is a fragmentary, greatly enlarged view of a portion of the capacitor of the present invention as shown in FIG. 6.

Referring now to FIGS. 2, 3, and 7, mounted within the openings 101 and 102, which are defined by the individual plastic frames 100, are individual carbon-filled, conductive electrode inserts which are designated generally by the numeral 120. The conductive electrode inserts 120 are manufactured from a carbon-plastic combination, such as carbon-filled, high density polyethylene. Each carbon-filled conductive electrode insert has a first surface 121, an opposite second surface 122, and a peripheral edge 123. The peripheral edge 123 of each of the individual conductive electrode inserts 120 is secured to the peripheral edges 103 or 104 of one of the openings 101 or 102, respectively. The conductive electrode inserts 120 may be mounted, or otherwise secured in the individual frames 100 by infrared-type thermal welding or ultrasonic-type thermal welding, for example. Electrode inserts of desired characteristics may be constructed using the teachings of U.S. Pat. No. 4,169,816, which is incorporated by reference herein. Electrode inserts useful in the present invention have a thickness in the range of about 0.001 inches to about 0.005 inches.

In addition, and as can best be seen by reference to FIG. 7, each carbon-filled conductive electrode insert 120 may have its outwardly facing surfaces 121 and 122 coated with active carbon particles. The carbon particles form a carbon coating 160. The carbon coating 160 increases the surface area of the conductive electrode insert 120. The active carbon particles may be applied to the electrode insert surface by means of an adhesive. It has been found that an adhesive under the tradename Eccocoat 258A, available from Emerson and Cuming, and another adhesive under the product number #W101894-3, available from Advanced Polymer Concepts, are suitable adhesives. The adhesive may be applied manually by rolling, brushing, or spraying it on the surface of the electrode. The electrode insert is then placed in a tray filled with active carbon particles, or carbon powder, so that a layer of carbon particles, approximately 0.003 of an inch thick, is formed on each of the outwardly facing surfaces 121 and 122. In addition, the carbon powder may be sprinkled or sprayed on the surfaces 121 and 122. The carbon covered electrode insert is then placed in a heated press and the carbon particles are hot-pressed into the surfaces 121 and 122. A carbon powder suitable for forming the carbon coating of the present invention is available from the Calgon Carbon Corporation under the designation TOGLF 80×325.

In addition to applying carbon particles, the surface area of the conductive electrode inserts may also be increased by laminating a high surface area carbon cloth to the respective surfaces 121 and 122.

Structurally, each individual conductive electrode insert 120 may include a metal screen 140 which is embedded therein. In addition, a plastic screen 170 may be mounted on either or both of the surfaces 121 and 122. As should be understood, two conductive electrode inserts 120, are individually mounted within each of the openings 101 and 102 and thereby form an electrode 180 (FIG. 3). Each capacitor 10 includes a plurality of electrodes 180 which are spaced a predetermined distance apart and are disposed in substantially parallel relation one to the other.

Figures 8, 9:
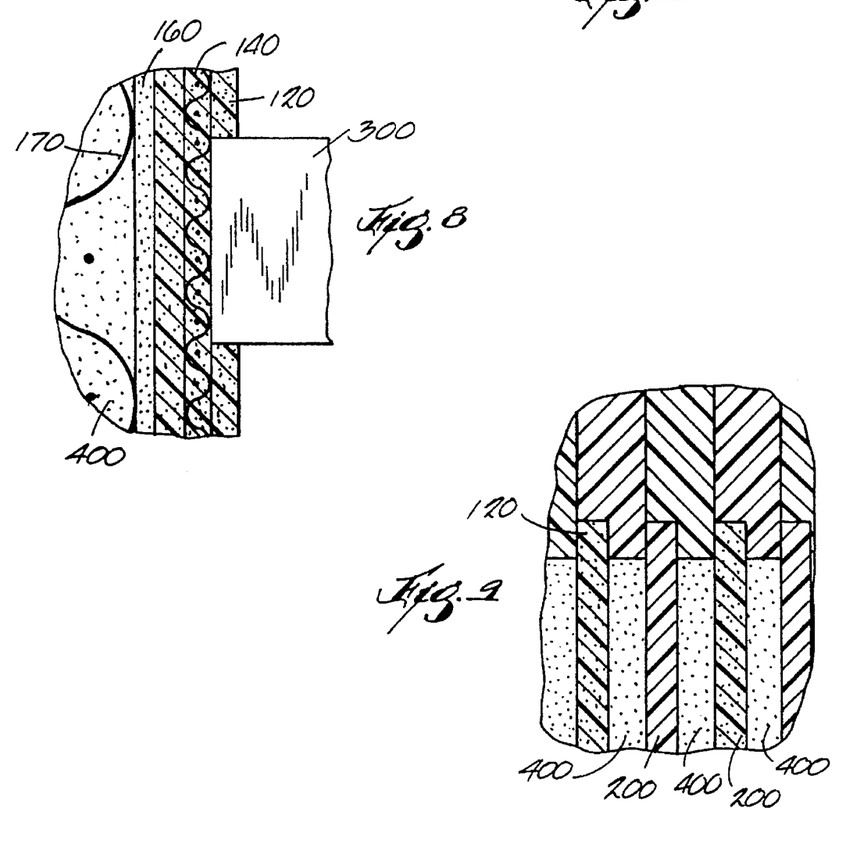
FIG. 8 is a fragmentary, greatly enlarged view of a portion of the present invention as shown in FIG. 6.
FIG. 9 is a fragmentary, slightly enlarged view of a portion of the present invention as shown in FIG. 6.

As noted in the previous paragraph, the conductive electrode inserts 120 may include various components and coatings. The most simple configuration of the present invention is shown in FIG. 9, where the conductive electrode inserts 120 consist only of a sheet of carbon plastic, or carbon-filled polyethylene. The conductive electrode inserts 120 may or may not include the carbon coating 160, the metal screen 140, or the plastic screen 170. The coating 160 and plastic screen 170 may be on either or both sides of the conductive electrode inserts 120.

Preferably, about 98% of the area of the plastic screen 170 is open. The plastic screens help ensure uniform spacing between adjacent components of the capacitor. The screen has nodes at points where horizontal and vertical members of the mesh meet. The nodes have a thickness of about 0.025 inches, thus with the screen in place a spacing of about 0.025 inches is maintained between adjacent components.

Figure 4:
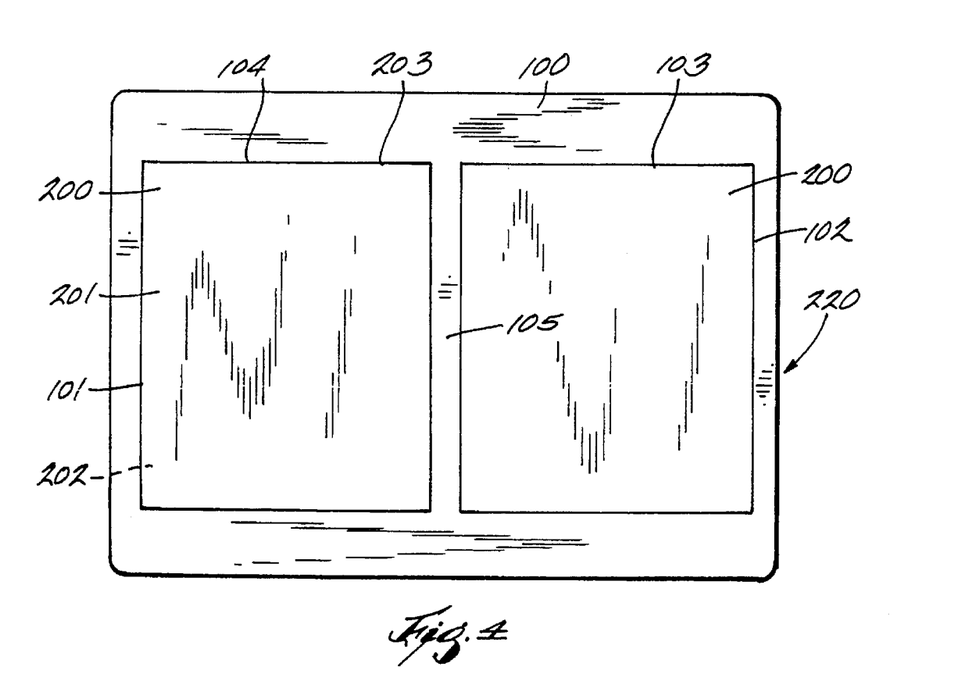
FIG. 4 is a side elevation view of a separator employed in the capacitor of the present invention.

As can best be seen by further reference to FIG. 4, within the openings 101 and 102 of a predetermined number of non-conductive frames 100 are mounted a plurality of microporous separators 200. The microporous separator inserts 200 are preferably manufactured from a material such as silica-filled, high density polyethylene.

Each of the microporous separator inserts 200 has a first surface 201, an opposite second surface 202, and a peripheral edge 203. The peripheral edge 203 of any one of the microporous separator inserts 200 may be welded to one of the peripheral edges 103 or 104 of one of the openings 101 or 102. As with the conductive electrode inserts 120, the microporous separator inserts 200 may be mounted in the frames 100 by thermal welding, or similar techniques. A plastic frame 100 having two microporous separator inserts 200, each of which is individually mounted within the openings 101 and 102, respectively, constitutes a single separator 220. The capacitor 10 of the present invention includes a plurality of separators 220 which are positioned in sandwiched relation between adjacent electrodes 180 or between one electrode 180 and a terminal electrode, discussed in further detail below. Separators useful in the present invention have a thickness in the range of about 0.001 inches to about 0.005 inches. As should be understood, the microporous separators are ion-selective membranes, and various ion-selective membranes known in the art may be mounted in the frames described above, or otherwise welded between adjacent electrodes 180.

As can best be seen by reference to FIG. 2, a series of alternating electrodes 180 and separators 220 forms a cell stack 240. Thus, the capacitor 10 of the present invention has a multi-layer construction. The frames 100 of the electrodes 180 and separators 220 are joined, or otherwise sealed one to the other by vibration-type thermal welding, or by similar fastening techniques.

Figure 5:
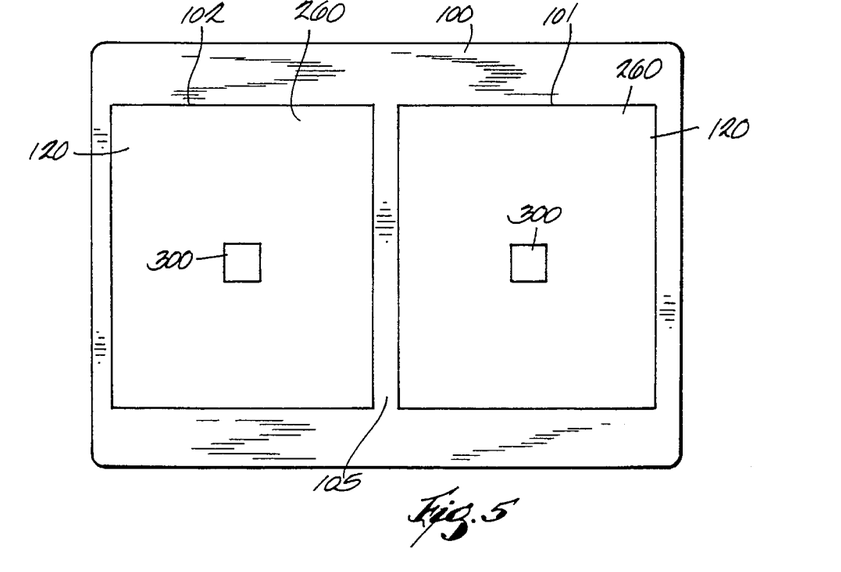
FIG. 5 is a side elevation view of a terminal electrode employed in the capacitor of the present invention.

Fastened to the stack 240 by a thermal welding technique, or the like, are two terminal electrodes which are designated generally by the number 260. As can best be seen by reference to FIGS. 5 and 7, a terminal electrode has a construction somewhat similar to the electrodes 180. In this regard, a terminal electrode 260 includes a non-conductive frame 100; two conductive electrode inserts 120; each of which is individually mounted in the opening 101 and 102 of the frame 100; and two metal screens 140, each of which is embedded in the individual conductive electrode inserts. Each metal screen acts as a current collector, and could, for example, take the form of a perforated metal sheet or other thin layer of conductive material. Electrically coupled to, and centrally positioned on each metal screen 140 is a metal stud terminal 300, which as described above is adapted to be received through the individual openings found in the endblocks. The metal screens 140 and metal stud terminals 300 are preferably made from copper. The metal stud terminals 300 provide a path through which electric charge may leave the capacitor 10. In addition, they provide points across which an electric potential may be applied in order to charge the capacitor 10.

In an alternative embodiment, seen more clearly by reference to FIG. 2, conductive electrode inserts, each having a metal screen imbedded therein and a metal stud terminal which is electrically coupled to the metal screen, are mounted in the first and second rigid endblocks. Such endblocks function as terminal electrodes and, therefore, in a capacitor having such endblocks the necessity of having separate terminal electrodes is eliminated.

As should be understood the endblocks 20 and 30; electrodes 180; separators 220; and terminal electrodes are welded or fastened together to form a sealed case. As noted above, the capacitor 10 of the present invention may be constructed using thermal welding techniques. The method employed to construct a capacitor 10 is similar to the method of constructing the battery which is disclosed in U.S. Pat. No. 4,945,019, the specification of which is incorporated by reference herein. Adjacent components are welded together into a welding machine (not shown). The first weld is accomplished by placing an endblock in the lower fixture of a welding machine and placing a terminal electrode in the upper fixture of the machine. The lower fixture moves along a predetermined course of travel until physical contact is made between the two components. Vibration of a predetermined magnitude is imparted to the objects and a weld is achieved thereby.

The process continues when the component in the upper fixture, which during the first weld is the terminal electrode, is disengaged and the lower fixture moves in a direction away from the newly welded component. Another component is then secured to the top fixture and the process is repeated. When the desired number of components are welded to the stack, which is located on the bottom fixture, an endblock is placed in the upper fixture and welded to the end of the stack to complete the process. Thus, the components of the capacitor 10 are welded together to form a fluid impervious and substantially leak-proof case. The components are welded in an alternating fashion as depicted in FIG. 2, wherein alternate layers of electrodes 180 and separators 220 make up the stack of cells 240. One of the key features of the present invention is the rib 105 of each of the frames 100. Each of the ribs divides the frame such that it has two or more openings. The ribs are welded together, providing structural strength at the center of each electrode and separator. This design helps reduce bowing or deformation of the electrodes and separators compared to a design where a single, large electrode or separator insert is mounted within a one-opening frame. In addition, the frame design and welding techniques eliminate the need to apply external pressure to the capacitor components as is the case with prior-art devices.

The active area of a capacitor of the present design may be adjusted in two ways. First, the size of the electrode inserts may be varied. For example, an electrode having a width of about 9 inches and a length of about 10 inches may be easily constructed. Electrodes of greater size can also be constructed. The larger the electrodes the greater the capacitance of an individual cell. Second, the number of electrodes may be adjusted by simply welding more components to the stack of cells. Capacitors having tens of cells can be readily and easily constructed. Accordingly, the capacitance of the capacitor is readily adjusted. Each cell is electrically coupled in series, therefore, the more cells the lower the capacitance of the capacitor. The total capacitance, $C_T$, may determined according to the following equation:

$$\frac{1}{C_T} + \frac{1}{C_{cell1}} + \frac{1}{C_{cell2}} + \frac{1}{C_{cell3}} + \ldots + \frac{1}{C_{cell\,n}}.$$

Figure 6:
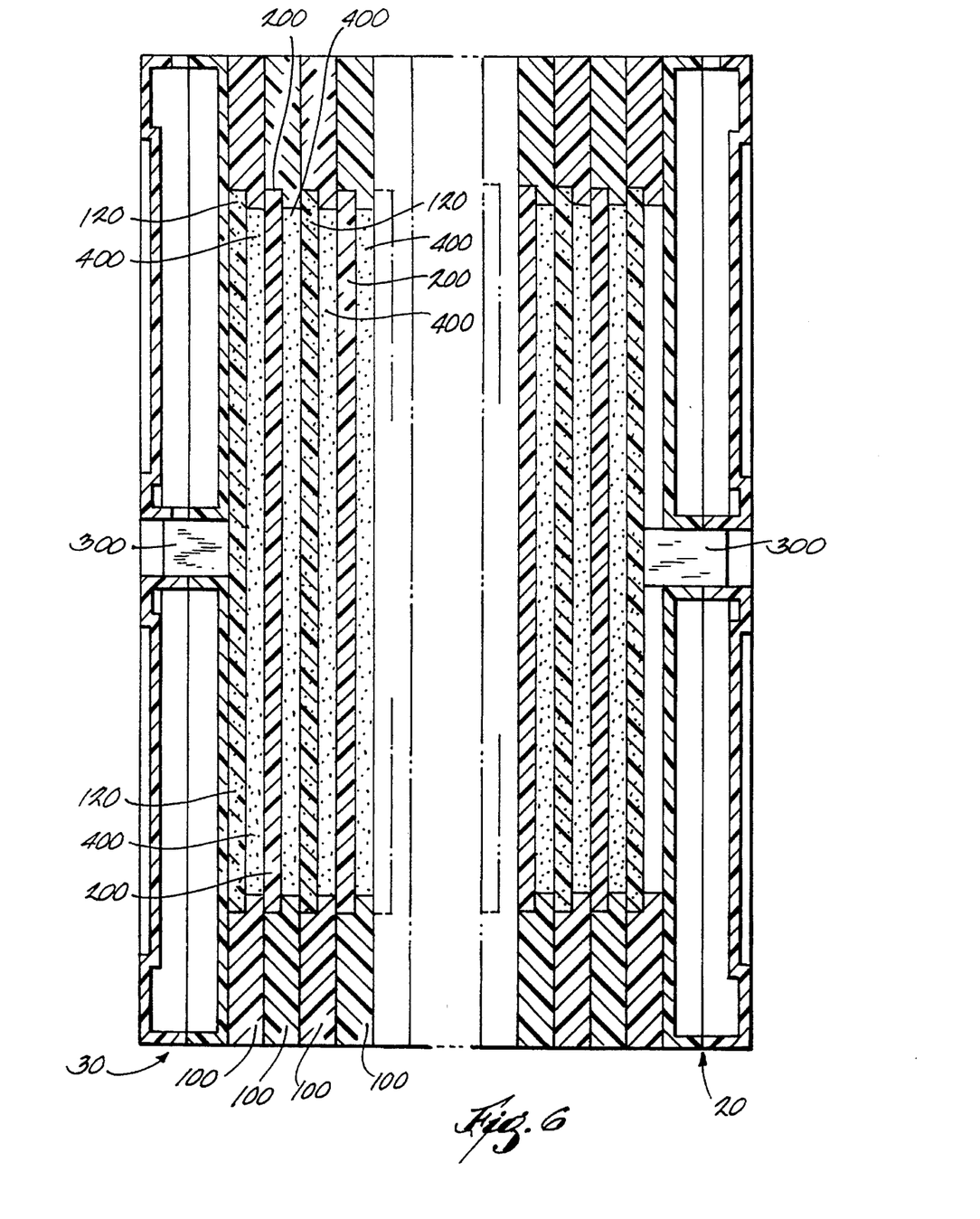
FIG. 6 is a fragmentary, greatly enlarged, cross sectional view of the capacitor of the present invention taken from a position along line 6—6 of FIG. 1.

As can be best seen in FIG. 6, the capacitor 10 of the present invention includes a carbon paste 400 which is positioned between the electrodes 120 and separators 200. The carbon paste 400 may be directly applied to the electrodes during the welding process. This step may be achieved by both automated and manual application techniques.

The carbon paste 400 consists of a mixture of carbon powder and sulfuric acid. Various types of carbon powder have been found suitable for making the paste 400. Carbon powder under the tradename Carbon Black Pearls 2000 may be mixed with sulfuric acid having a specific gravity of approximately 1.85 in a ratio of about 86 percent acid to about 14 percent carbon powder, by weight, to form a suitable paste. Carbon powder under the tradename Osaka M-15 may be mixed in a ratio of about 72 percent acid to about 28 percent carbon, by weight, to form another suitable paste.

As noted above, the carbon paste 400 is placed between the electrodes 180 and separators 220 during the welding process. The paste may be run or put through a coining machine which rolls the paste into a flexible stratum of substantially uniform thickness. Preferably, the paste is about 0.002 inches to about 0.050 inches thick. In order to improve the electrical contact between the paste 400 and the electrode inserts 120, and as was discussed above, the carbon coating 160 is applied to the surface of the electrode insert 120. It has been found that the presence of the carbon coating increases the capacitance of the capacitor, as is exemplified in the table below which compares the capacitance of two three-cell capacitors having 145 $cm^2$ electrode inserts prepared with the carbon coating 160 on both surfaces of their electrode inserts and without the carbon coating 160.

TABLE 1

Effect of Applying Carbon Powder To The Paste/Plastic Interface On Capcitor Performance

| Discharge Current (AMPS) | Capacitance w/o Carbon Layer (Farads) | Capacitance w/Carbon Layer (Farads) | Percent Increase (%) |
|---|---|---|---|
| 2 | 48.63 | 53.06 | 9.1 |
| 6 | 47.65 | 53.57 | 12.4 |
| 14 | 50.2 | 54.26 | 8.1 |
| 20 | 51.95 | 58.33 | 12.3 |

As should be understood, a paste-filled and operational capacitor 10 includes two capacitor cells 420 and 425 (FIG. 1) due to the side-by-side, dual opening configuration of the frames 100. The capacitor cells 420 and 425 are in side-by-side position to one another. Each capacitor cell is electrically isolated from the other. As should be understood charge flow through each cell is from end to end. In other words, during discharge, charge flows directly from one metal terminal stud positioned in the end block 20, through a load, and then to the corresponding metal terminal stud in the end block 30. Of course, charge flows in the opposite direction during charge. Thus, the capacitor 10 includes two parallel current paths 426 and 428 (FIG. 2).

Initially, the capacitor 10 of the present invention is uncharged, that is, when first constructed the capacitor 10 holds no electric energy. The capacitor 10 may charged by applying an electric voltage across its terminal studs. In particular, each cell 420 and 425 may be charged by applying a voltage across the metal stud terminals. In order to charge the cell 420 of the capacitor 10 a voltage must be applied across the metal stud terminal positioned in the end block 30 and the metal stud terminal in the end block 20. Likewise, a voltage must be applied across the two metal stud terminals of the cell 425. Once charged, the capacitor may be allowed to hold its charge, or the capacitor 10 may be discharged by appropriately coupling a load to the metal stud terminals.

In a double-layer capacitor, such as the one of the present invention, it is important that the active materials and components, that is the carbon paste and electrodes, be kept under substantially uniform compression. For example, when two components of the capacitor 10 are joined by a thermal weld, the components are compressed evenly and uniformly while the weld is being made. In the welding process, the welding machine itself does the compression. Under some circumstances the parts may be compressed in a jig. Once the weld is made, the parts stay in compression, thereby assuring proper electrical contact between the carbon paste and the individual electrodes. Typically, components are welded together under a compression pressure in a range of about 50 to about 200 lbs per square inch.

Accordingly, the construction of the present invention results in a capacitor which has extremely low internal resistance. In addition, the components are welded in a manner where they are substantially hermetically sealed to each other. Accordingly, the capacitor 10 of the present invention, as noted earlier, is substantially leak-proof because there are no seals through or around which a fluid may flow. In addition, the capacitor 10 of the present invention is made substantially leak-proof because the high density polyethylene components are highly corrosion resistant.

OTHER EMBODIMENTS

The frames 100 may be of various geometric configurations. Thus, a frame having one, two, three, four, or more openings could be manufactured and subcomponents, such as electrode inserts and separators, could be mounted therein.

Figure 11:
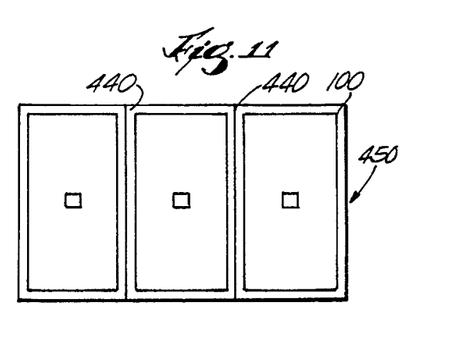
FIG. 11 is a side elevation view of a terminal electrode of a third embodiment of the present invention.

In a second embodiment of the present invention, the frame 100 includes three openings and two ribs 440 so as to permit the construction of a three-cell capacitor. A terminal electrode 450 for a three-cell capacitor is shown in FIG. 11.

Figure 10:
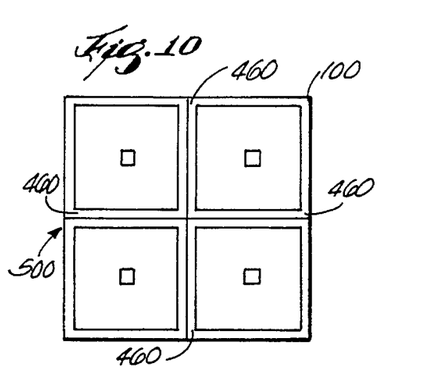
FIG. 10 is a side elevation view of a terminal electrode of a second embodiment of the present invention.
Figure 12:
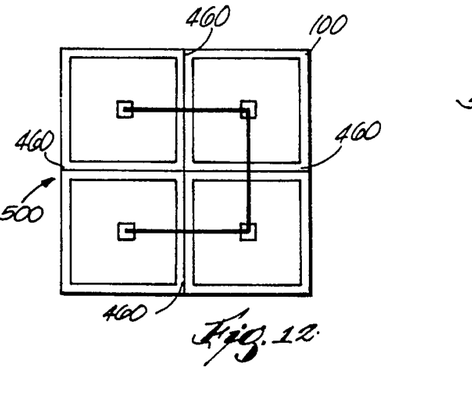
FIG. 12 is a side elevation view of a terminal electrode of the second embodiment of the present invention which shows the terminal studs electrically coupled to one another so as to electrically couple the cells of the capacitor in parallel.
Figure 13:
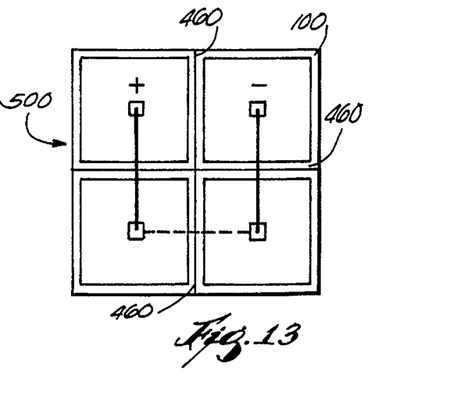
FIG. 13 is a side elevation view of the electrode of the second embodiment of the present invention which shows the terminal studs electrically coupled to one another so as to electrically couple the cells of the capacitor in series.

A third embodiment of the present invention is shown in FIGS. 10, 12, and 13. In the third embodiment, the frame 100 includes four openings and four ribs 460 so as to permit the construction of a four-quadrant capacitor having four capacitor cells. A terminal stud of terminal electrode 500 of the four-quadrant capacitor may be electrically coupled by means, for example, of a metal bus bar to another terminal stud of the same electrode. The terminal electrodes may be electrically coupled so as to electrically couple the capacitor cells in parallel, as in FIG. 12, or in series as in FIG. 13. The choice of parallel or series coupling depends on the voltage and capacitance desired from the capacitor. In order to couple the cells of the four-quadrant capacitor in parallel, the connections shown in FIG. 12 would be the same for the terminal electrode at the opposite end of the capacitor. In order to couple the cells in series, there is a bus bar connection between two terminal studs of the terminal electrode of the opposite end of the capacitor as shown in phantom lines in FIG. 13.

OPERATION

In summary, the capacitor 10 of the present invention includes a plurality of electrodes and separators. Further, the electrodes and separators are oriented or otherwise disposed in alternating succession and further have a carbon paste placed therebetween. A large number of capacitor cells may be incorporated into a single capacitor. Proportionally greater voltage can be achieved in capacitors having 50 to 60 or more cells. Such capacitors would have usefulness for SLI applications in which previous capacitors were unsuitable. In addition, the size of the electrode inserts may be relatively large. Therefore, a high farad capacity may be achieved. As can be seen from Table 1, a relatively small, three cell capacitor of the present invention has a capacitance of about 53 to 58 farads.

Thus, the present invention provides a new and novel capacitor which is manufactured from a corrosion resistant material such as plastic, which further is of a gasket-free design, and which avoids the problems attendant with the prior-art practice of applying external pressure to these same assemblies. In particular, the present invention provides a capacitor having relatively low internal resistance, and a high farad capacity. The present invention also provides a capacitor that is lightweight in relative comparison to the prior-art assemblies. The present invention also provides a capacitor which is substantially leak-free and corrosion resistant. Lastly, the present invention provides a capacitor which is easy to dispose of once it has reached the end of its life cycle and which is made from recyclable materials. It is to be understood that the invention is not confined to the particular construction and arrangement of the components herein illustrated and described, but embraces such modified forms thereof as come within the scope of the following claims.

What is claimed is:

1. A capacitor comprising:

a first plurality of non-conductive plastic frames having at least one conductive electrode insert mounted therein, and wherein the at least one conductive electrode insert has a first surface and an opposite second surface;

a second plurality of non-conductive plastic frames each having at least one separator insert borne therein, and wherein each of the second plurality of non-conductive plastic frames is positioned in sandwiched relation between two adjacent non-conductive frames of the first plurality of non-conductive frames;

a carbon paste positioned between each of the frame-mounted conductive electrode inserts and each of the frame-mounted separator inserts, the frame-mounted conductive electrodes and separators and the carbon paste forming at least one capacitor cell; and first and second terminal electrodes, each terminal electrode electrically coupled to the at least one capacitor cell and including at least one conductive electrode insert having a current collector, and a terminal for electrically coupling the capacitor to external circuits;

wherein the capacitor is operable to store electrostatic energy.

2. A capacitor as claimed in claim 1, and wherein a carbon coating is applied on the first and second surfaces of at least one of the plurality of conductive electrode inserts.

3. A capacitor as claimed in claim 1, and wherein the capacitor includes a first endblock and a second endblock, and wherein the first terminal electrode is mounted on the first endblock and the second terminal electrode is mounted on the second endblock.

4. A capacitor as claimed in claim 1, and wherein the first terminal electrode is mounted on one of a third plurality of plastic frames and the second terminal electrode is mounted on another one of the third plurality plastic frames.

5. A capacitor as claimed in claim 1, and wherein the carbon paste includes a mixture of carbon powder and sulfuric acid.

6. A capacitor as claimed in claim 1, and wherein each frame includes at least one rib which divides the frame so that it has two or more openings.

7. A capacitor comprising;

a plurality of electrodes and wherein each electrode is spaced a predetermined distance apart and disposed in substantially parallel relation one to the other;

a plurality of separators, and wherein each separator is positioned in sandwiched relation between two adjacent electrodes;

a carbon paste oriented between each electrode and separator; and first and second terminal electrodes, each terminal electrode electrically coupled to at least one electrode and having a metal screen imbedded in it, and a metal stud electrically coupled to the metal screen;

wherein the capacitor is operable to store electrostatic energy.

8. A capacitor as claimed in claim 7, and wherein each of the electrodes includes a plastic frame having a plurality of openings, and a conductive electrode insert mounted within in each of the respective openings.

9. A capacitor as claimed in claim 8, and wherein each separator includes a plastic frame having a plurality of openings, and a separator insert mounted within in each of the respective openings.

10. A capacitor as claimed in claim 9, and wherein the carbon paste contains a mixture of carbon powder and sulfuric acid.

11. A capacitor for storing electric charge, the capacitor comprising:

a first plurality of non-conductive plastic frames, each having at least one carbon-filled conductive electrode insert mounted therein, each carbon-filled conductive electrode insert having a first surface and an opposite second surface;

a second plurality of non-conductive plastic frames, each having at least one microporous separator insert borne therein, each frame-mounted microporous separator insert positioned in sandwiched relation between two adjacent frame-mounted carbon-filled conductive electrode inserts;

first and second endblocks, each endblock including at least one conductive electrode insert mounted thereon and which has a metal screen imbedded in it, and a metal stud electrically coupled to the metal screen; and a carbon paste positioned between each of the frame mounted carbon-filled conductive electrode inserts and each of the frame-mounted microporous separator inserts;

wherein the non-conductive plastic frames are welded to each other to form a stack of alternating components and are positioned between the first and second endblocks.

12. A capacitor as claimed in claim 11, and wherein a carbon coating is applied on at least one surface of each of the plurality of carbon-filled conductive electrode inserts.

13. A capacitor as claimed in claim 12, and wherein a plastic screen is mounted on the first surface of each of the plurality of carbon-filled conductive electrode inserts.

14. A capacitor as claimed in claim 13, and wherein a plastic screen is mounted on the second surface of each of the plurality of carbon-filled conductive electrode inserts.

15. A capacitor as claimed in claim 12, and wherein a plastic screen is mounted on the second surface of each of the plurality of carbon-filled conductive electrode inserts.

16. A capacitor as claimed in claim 12, and wherein the carbon paste includes sulfuric acid, having a specific gravity of about 1.8 to about 1.9, and carbon powder in a ratio of about 72 percent acid to about 86 percent acid to about 28 percent carbon powder to about 14 percent carbon powder, by weight.

17. A capacitor as claimed in claim 12, and wherein each of the first and second pluralities of non-conductive plastic frames has at least two openings, and the stack of components defines at least two adjacent capacitor cells which are capable of being electrically coupled to each other.

18. A capacitor as claimed in claim 17, and wherein the capacitor cells are electrically coupled in parallel.

19. A capacitor as claimed in claim 17, and wherein the capacitor cells are electrically coupled in series.

20. A capacitor as claimed in claim 17, and wherein each endblock has a center rib to maintain endblock pressure.

21. A capacitor for storing electric charge, the capacitor comprising:
- a first plurality of non-conductive frames, each having at least one conductive electrode insert mounted therein, each conductive electrode insert having a first surface, an opposite second surface, and a thickness dimension of about 0.001 to 0.005 inches;
- a carbon coating applied on at least one surface of each of the carbon-filled conductive electrode inserts;
- a second plurality of non-conductive plastic frames, each having at least one ion-selective membrane insert borne therein, each of the second plurality of non-conductive plastic frames positioned in sandwiched relation between two adjacent non-conductive plastic frames of the first plurality of non-conductive plastic frames;
- a plurality of non-conductive, mesh-like, spacers, each spacer individually disposed between at least one conductive electrode insert and at least one ion-selective membrane insert;
- a carbon paste positioned between each of the conductive electrode inserts and each of the ion-selective inserts, the carbon paste including sulfuric acid having a specific gravity of about 1.8 to about 1.9, and carbon powder in a ratio of about 72 percent acid to about 86 percent acid to about 28 percent carbon powder to about 14 percent carbon powder, by weight; the conductive electrodes, separators, spacers, and carbon paste forming at least one capacitor cell; and
- at least two terminal electrodes, each terminal electrode electrically coupled to the at least one capacitor cell and including at least one conductive electrode insert having a current collector imbedded in it, and a terminal for electrically coupling the capacitor to external circuits.

22. A capacitor comprising:
- a first plurality of non-conductive frames having at least one conductive electrode insert mounted therein, the at least one conductive electrode insert having a first surface and an opposite second surface;
- a second plurality of non-conductive frames having at least one separator insert mounted therein, each of the second plurality of non-conductive frames positioned in sandwiched relation between two adjacent non-conductive frames of the first plurality of non-conductive frames;
- a carbon paste positioned between each of the frame-mounted conductive electrode inserts and separator inserts, the frame-mounted conductive electrodes and separators and the carbon paste forming at least one capacitor cell; and
- first and second terminal electrodes, each terminal electrode electrically coupled to the at least one capacitor cell and including at least one conductive electrode insert, the at least one conductive electrode insert having a current collector and a terminal for electrically coupling the capacitor to external circuits;

wherein the capacitor is operable to store electrostatic energy.

23. A capacitor comprising:
- a first plurality of non-conductive frames, each having a first opening and a second opening and a single conductive electrode insert mounted in each opening, each conductive electrode insert having a first surface and an opposite second surface;
- a second plurality of non-conductive frames, each having a first opening and a second opening and a single separator insert mounted in each opening, each of the second plurality of non-conductive frames positioned in sandwiched relation between two adjacent non-conductive frames of the first plurality of non-conductive frames;
- a carbon paste positioned between each of the frame-mounted conductive electrode inserts and separator inserts, the frame-mounted conductive electrodes and separators and the carbon paste forming at least two side-by side capacitor cells; and
- first and second terminal electrodes, each terminal electrode electrically coupled to the at least two side-by-side capacitor cells and including at least two conductive electrode inserts, the at least two conductive electrode inserts having a current collector and a terminal for electrically coupling the capacitor to external circuits;

wherein the capacitor is operable to store electrostatic energy.

24. A capacitor comprising:
- a plurality of non-conductive plastic frames, each plastic frame having a first opening, a second opening, and a third opening;
- a plurality of conductive electrode inserts mounted in a first number of the plurality of the non-conductive plastic frames, one conductive electrode insert being mounted in the first, second, and third openings, respectively, each conductive electrode insert having a first surface and an opposite second surface;
- a plurality of separator inserts borne by a second number of the non-conductive plastic frames, one separator insert being mounted in the first, second, and third openings, respectively, each of the second number of non-conductive frames positioned in sandwiched relation between two adjacent frames of the first number non-conductive plastic frames;
- a carbon paste positioned between adjacent conductive electrode inserts and separator inserts which are mounted in the corresponding first, second, and third openings of the first and second number of non-conductive plastic frames, the frame-mounted conductive electrodes and separators and carbon paste forming at least three side-by-side capacitor cells; and
- first and second terminal electrodes, each terminal electrode electrically coupled to the at least three side-by-side capacitor cells and including three conductive electrode inserts, each conductive electrode insert having a current collector and a terminal for electrically coupling the capacitor to external circuits;

wherein the capacitor is operable to store electrostatic energy.

25. A capacitor comprising:
- a plurality of non-conductive plastic frames, each plastic frame having a first opening, a second opening, a third opening, and a fourth opening;
- a plurality of conductive electrode inserts mounted in a first number of the non-conductive plastic frames, one conductive electrode insert being mounted in the first, second, third, and fourth openings, respectively, each conductive electrode insert having a first surface and an opposite second surface;
- a plurality of separator inserts borne by a second number of the non-conductive plastic frames, one separator insert being mounted in the first, second, third, and fourth openings, respectively, each of the second number of non-conductive plastic frames positioned in sandwiched relation between two adjacent frames of the first number of non-conductive plastic frames;

a carbon paste positioned between adjacent conductive electrode inserts and separator inserts which are mounted in the corresponding first, second, third, and fourth openings of the first and second number of non-conductive plastic frames, the frame-mounted conductive electrodes and separators and the carbon paste forming at least four capacitor cells; and first and second terminal electrodes, each terminal electrode electrically coupled to the at least four capacitor cells and including four conductive electrode inserts, each conductive electrode insert having a current collector and a terminal for electrically coupling the capacitor to external circuits;

wherein the capacitor is operable to store electrostatic energy.

* * * * *